United States Patent [19]

Graff et al.

[11] 4,408,939
[45] Oct. 11, 1983

[54] COMPOSITE FASTENER FOR ATTACHING SPLASH GUARD

[75] Inventors: Henry W. Graff, Elgin; Lloyd A. Erickson, Park Ridge, both of Ill.

[73] Assignees: Pathfinder Auto Lamp Company, Niles; Illinois Tool Works Inc., Chicago, both of Ill.

[21] Appl. No.: 240,801

[22] Filed: Mar. 5, 1981

[51] Int. Cl.³ .......................................... F16B 37/04
[52] U.S. Cl. ..................................... 411/112; 411/174
[58] Field of Search ............... 411/112, 111, 113, 103, 411/174, 172, 173, 175, 107

[56] References Cited

U.S. PATENT DOCUMENTS

| 2,258,845 | 10/1941 | Burke | 411/175 X |
| 2,394,729 | 2/1946 | Tinnerman | 411/112 |
| 2,631,634 | 3/1953 | Tinnerman | 411/113 |
| 2,633,886 | 4/1953 | Tinnerman | 411/112 |
| 2,745,458 | 5/1956 | Bedford | 411/173 X |
| 2,888,971 | 6/1959 | Wootton | 411/112 |
| 3,115,805 | 12/1963 | Engelmann | 411/352 |

Primary Examiner—Ramon S. Britts
Attorney, Agent, or Firm—Lockwood, Dewey, Alex & Cummings

[57] ABSTRACT

A composite fastener for use in attaching a splash guard to a free edge of a flange in a vehicle wheel well and including a sheet metal S-clip, a washer head screw retained against rotation in the clip so that the shank projects from one side of the S-clip and a nut on the outer end of the screw shank. The space between the intermediate leg and the outer leg of the S-clip opposite the screw is adapted to receive the free edge of the flange therein. The screw shank penetrates a portion of the splash guard which is retained by the nut.

6 Claims, 8 Drawing Figures

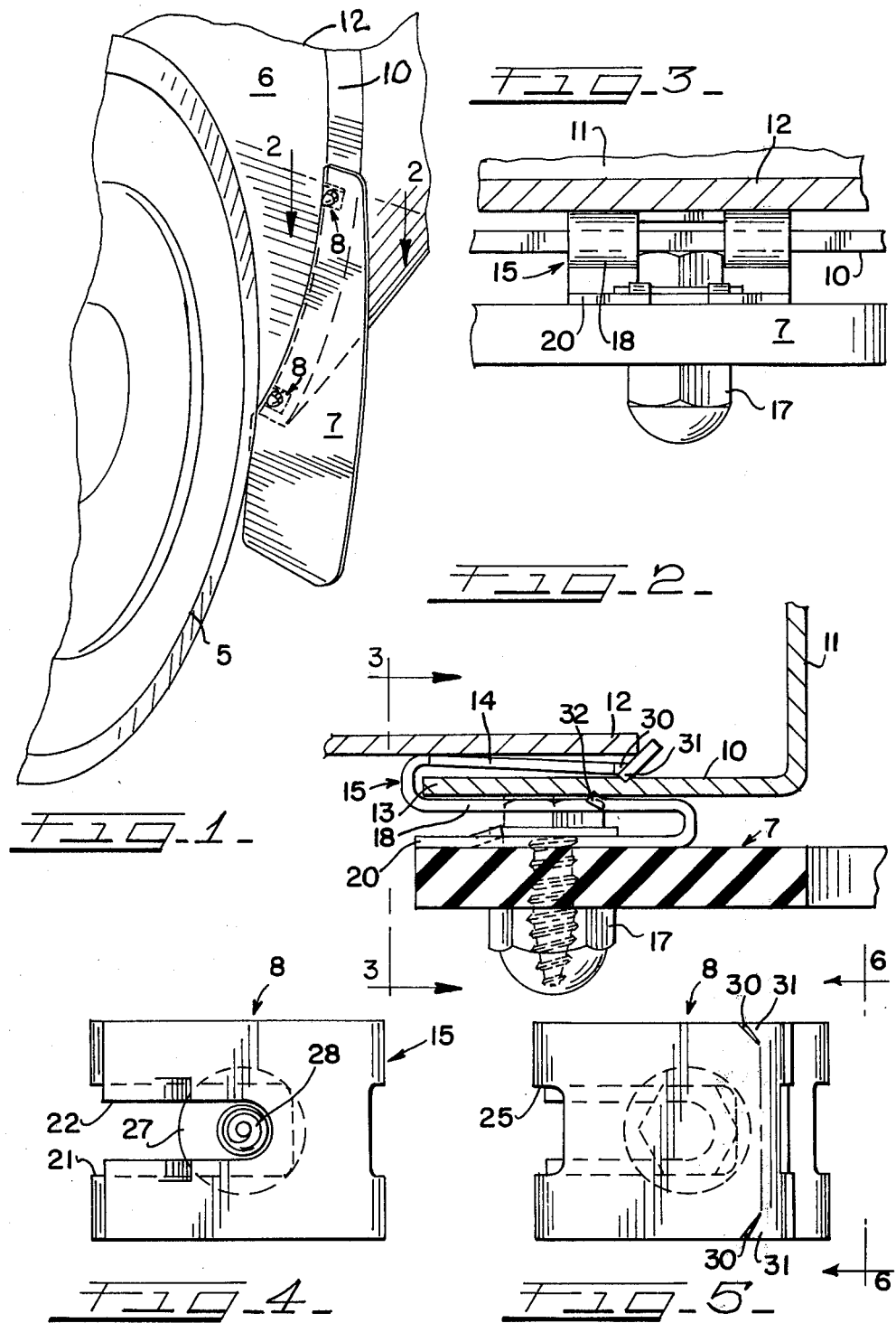

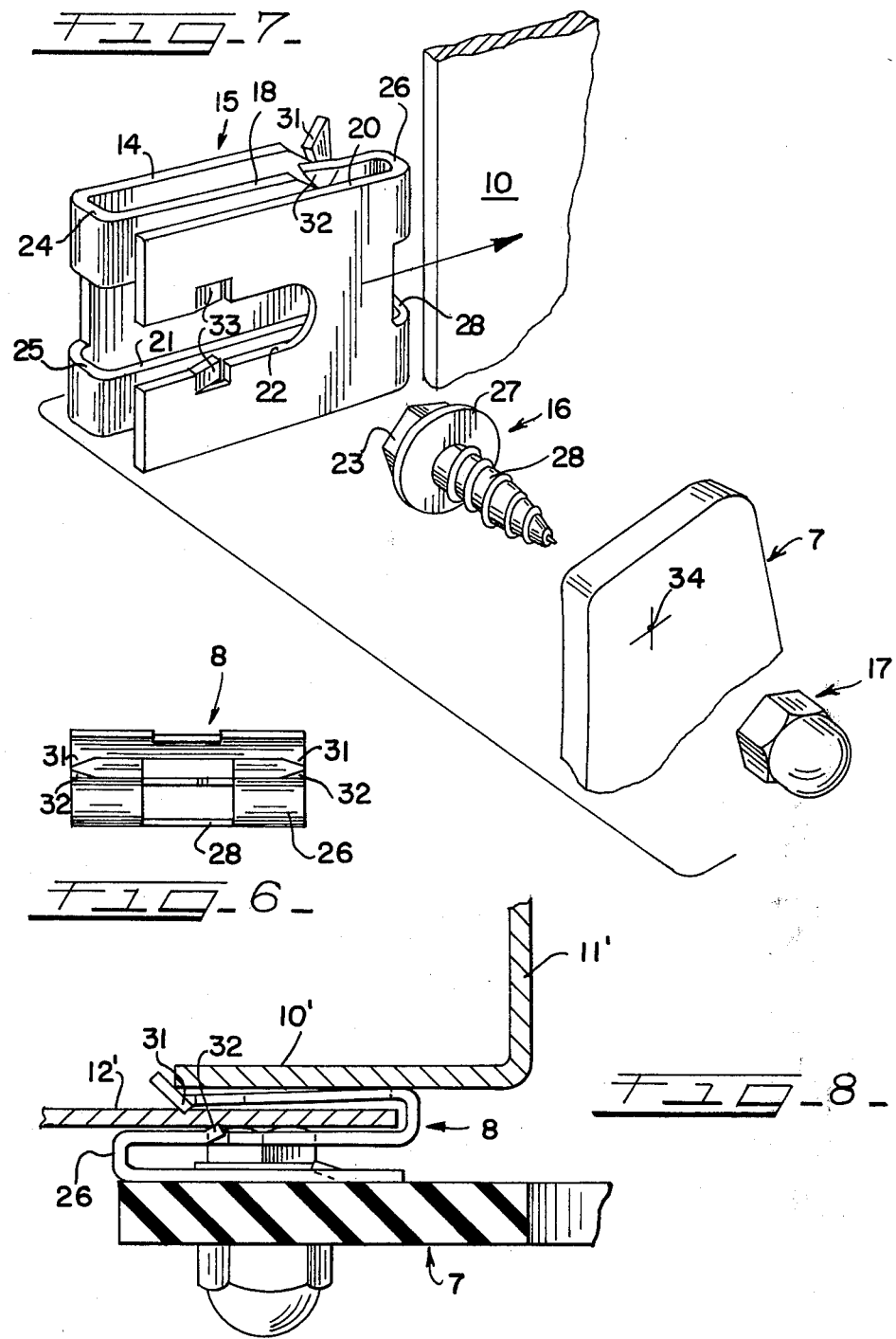

COMPOSITE FASTENER FOR ATTACHING SPLASH GUARD

This invention relates generally to innovations and improvements in fastener means whereby an after-market customer, as distinguished from the original manufacturer, may readily mount splash guards in the appropriate locations in wheel wells of automobiles. More particularly, the invention relates to such fastening means taking the form of a composite fastener comprising a sheet metal S-clip formed of spring metal, a washer head screw trapped against rotation in the S-clip, with the screw shank projecting generally at right angles from one side, and a nut for the screw. The S-clip on its side opposite that from which the screw projects is adapted to fit over the free edge of a flange in the wheel well so as to retain the S-clip in place thereon while the shank of the screw projects through a portion of the splash guard with the nut securing the same in place.

A general object of the invention is to provide a composite fastener of the type described for mounting a splash guard in the wheel well of a vehicle which composite fastener is inexpensive, is easily installed by non-skilled persons pursuant to easily followed directions, and makes use of commercially available washer head screws and nuts.

Certain other objects of the invention will become apparent from the following detailed description of the invention taken in connection with the accompanying drawings wherein:

FIG. 1 is a fragmentary perspective view showing a splash guard mounted in the front left wheel well of an automobile by means of two composite fasteners forming embodiments of the present invention;

FIG. 2 is an enlarged detail sectional view taken on line 2—2 of FIG. 1 through one of the two composite fasteners used to mount the splash guard in FIG. 1 and the adjacent wheel well structure;

FIG. 3 is an end view taken on line 3—3 of FIG. 2;

FIG. 4 is a front elevational view of the composite fastener shown in FIGS. 1-3 by itself but with the retention nut removed from the end of the screw;

FIG. 5 is a rear elevational view of the composite fastener shown in FIGS. 1-4;

FIG. 6 is an end elevational view of the S-clip used in the composite fasteners in FIGS. 1-5 and taken on line 6—6 of FIG. 5;

FIG. 7 is an exploded view showing each of the components of one of the composite fasteners used in FIG. 1 illustrating how the composite fastener is attached to the free edge of a flange in the wheel well and how the fastener is used to secure a splash guard in place; and FIG. 8 is an enlarged sectional view similar to FIG. 2 but showing how the composite fastener of FIGS. 1-7 may be used to mount a splash guard in the wheel well of a vehicle having a different flange arrangement than that shown in FIGS. 1-3.

Various forms of clips have previously been used for mounting splash guards. U.S. Pat. No. 4,099,736 dated July 11, 1978 shows a three-piece composite fastener used for this purpose. One-piece sheet metal S-clips have been used having re-entrant formations preventing or resisting clip removal. Sheet metal C-clips with screw and nut combinations have also been used with nuts on the ends of the screws.

In FIG. 1, the front wheel and tire 5 of a conventional automobile is shown in its associated wheel well indicated generally at 6 and having a splash guard 7 of known type mounted in the wheel well 6 by means of a pair of composite fasteners indicated generally at 8—8 forming presently preferred embodiments of the present invention.

For a detailed description of one of the composite fasteners 8 and the manner in which it is utilized in mounting the splash guard 7 in place in the wheel well 6, reference may be had to FIGS. 2-7. As is well-known, different makes and models of vehicles or automobiles have different wheel well designs. The particular wheel well shown in FIGS. 1-3 has an inturned or transverse flange 10 integrally formed on the fender 11 with the flange 10 extending over the wheel well liner 12. The free edge 13 of the flange 10 may be separated sufficiently from the wheel liner 12 so as to accommodate an outer leg 14 of a sheet metal S-clip indicated generally at 15 (FIG. 7). In addition to the S-clip 15, each of the composite fasteners 8 includes a washer head screw 16 and cap nut 17 of known commercial type.

The S-clip 15 is preferably formed from spring metal sheet stock by known shop techniques and equipment. In addition to the first outer leg 14, the S-clip 15 includes an intermediate leg 18 and a second outer leg 20. The outer legs 14 and 20 are generally parallel and planar and may be approximately square or somewhat elongated. Open ended slots 21 and 22 (FIG. 7) are formed in the intermediate leg 18 and the second outer leg 20, respectively. The width of the slot 21 is such as to accommodate, between its opposite sides, two opposing faces of the hex head 23 on the washer head screw 16 while the slot 22 is of a width to accommodate the shank 28 of the screw 16. The slot 21 is open at one end where it merges with and forms a continuation with the slot 25 and the bight portion 24 of the clip which joins one end of the intermediate leg 18 to the proximal end of the outer leg 14 as shown in FIG. 7. The opposite end of the intermediate leg 18 is joined to the proximal end of the outer leg 20 by a bight portion 26 which is preferably formed with an opening 28. The screw 16 has an integral washer 27 which is of such diameter that the head rides between the inner face of the outer leg 20 and the opposing face of the intermediate leg 18 as shown in FIGS. 2 and 3. The washer prevents removal of the screw except as it may be slid out the open ends of the slots 21 and 22.

Preferably, the distal end of the outer leg 14 is provided with opposing slits 30—30 (FIG. 5) and then tilted so as to provide inwardly projecting re-entrant points 31—31 which bite into the adjacent surface of the flange 10. Preferably, a pair of re-entrant points 32—32 are also formed on the intermediate leg 18 which bite into the adjacent surface of the flange 10 also as shown in FIG. 2. By means of the re-entrant points 31—31 and 32—32, the S-clip 15 grips the free edge 13 and cannot readily be withdrawn from the flange 10 once it is installed thereon. However, the S-clip can be shifted up and down on the flange 10 with relative ease during installation of the splash guard 7.

It is also desirable to strike inward projections 33—33 from opposing edges of the slot 22 in the outer leg 20 as shown in FIGS. 2 and 7 for the purpose of engaging the outer edge of the washer 27 on the screw 16 and thereby assist in trapping the screw 16 in place after it is inserted into the S-clip 15. This trapping action of the screw 16 can be readily completed if desired by using a pair of pliers to bend toward each other the bifurcated distal ends of the outer leg 20 of the S-clip 15.

Preferably, the splash guard 7 is provided with preformed openings for receiving the shank 28 of the screw 16, one of such openings being indicated at 34 in FIG. 7 and formed by right angular incisions in the splash guard 7. In mounting the splash guard 7 in the wheel well 6 by means of the composite fasteners 8, the splash guard 7 is first held by hand in the position it is to occupy and suitable markings are made on the wheel well liner 12 or flange 10 to indicate the locations of the composite fasteners 8. Then the splash guard is removed and the composite fasteners are put in place but with the nuts 17 removed therefrom. The upper opening 34 in the splash guard 7 is then pushed over the pointed end of the shank 28 and pushed in against the outer face of the outer leg 20. A nut 17 is then applied firmly to the projecting distal end of the shank 28. The shank 28 of the lower composite fastener 8 is similarly pushed through the lower opening 34 in the splash guard and a nut 17 applied thereto, thereby completing the mounting of the splash guard in the wheel well 6.

Referring to FIG. 8, a composite fastener 8 is shown installed in the wheel well of a vehicle wherein the wheel well liner 12' extends over the front side of the inturned flange 10' on the front fender 11'. Accordingly, the free edge of the wheel well liner 12' is the one that is available for receiving the S-clip of the composite fastener. This is readily accomplished by simply turning the S-clip 180° from the orientation shown in FIGS. 1–7.

Occasionally, wheel wells are encountered which do not have a free edge of a flange available for receiving S-clips 15. In such cases, the washer head screws 16 and nuts 17 can be used for mounting after drilling holes for receiving the screws. Thus, splash guards 7 and the composite fasteners 8 can be packaged in kits and marketed with the representation that the splash guards can be installed on most vehicles usually by use of the composite fasteners 8, and in special cases, by use of the washer head screws 16 and drilling.

What is claimed as new is:

1. A composite fastener for use in attaching a splash guard to a free edge of an exposed flange in vehicle wheel well, comprising, in combination: a sheet metal S-clip; a washer head screw; and, a nut for said screw; said sheet metal S-clip having planar generally parallel outer legs and a planar intermediate leg, said intermediate leg having a first slot therein extending inwardly from one end of said intermediate leg toward the opposite end thereof and said first slot having a width to slidably receive the head of said washer head screw without permitting rotation of said screw therein, and the end of said first slot adjacent said one end of said intermediate leg being open and merging into an opening in the adjacent loop connecting said one end of said intermediate leg with the proximal end of a first one of said outer legs, and the second and remaining outer leg having a second slot therein open at one end and extending inwardly from the distal end of said second outer leg, said first and second slots being in overlying registration, the shank of said screw being received in said second slot and projecting from said second outer leg and said S-clip at approximately a right angle thereto, said free edge of said wheel well flange being receivable in the space between said first outer and intermediate legs, said screw shank being passable through said splash guard, and said nut being retaied on the distal end of said screw shank.

2. The composite fastener called for in claim 1 wherein said washer head screw has a hex head the opposing parallel sides of which are retained between opposite sides of said first slot.

3. The composite fastener called for in claim 1 wherein said first and second slots terminate within said intermediate leg and said second outer leg, respectively.

4. The composite fastener called for in claim 1 wherein at least one of said first outer and intermediate legs has a re-entrant formation serving to resist separation of said S-clip from a free edge of flange received between said first outer and intermediate legs.

5. The composite fastener called for in claim 1 wherein at least one of said intermediate and second outer legs has a re-entrant formation serving to resist withdrawal of said washer head screw from said S-clip.

6. The composite fastener called for in claim 1 wherein said first and second outer legs have approximately square planar surfaces.

* * * * *